3,033,746
POLYALKYLENEIMINE, PHENOL GERMICIDES
Clarence L. Moyle, Clare, and Robert L. Johnson, Midland, Mich., assignors to The Dow Chemical Company, Midland, Mich., a corporation of Delaware
No Drawing. Filed June 19, 1958, Ser. No. 742,997
3 Claims. (Cl. 167—31)

This invention relates to new and improved compositions for use in coating compositions, oil and latex paint compositions and cellulosic materials to provide degradation resistant properties.

The control of microorganisms is a persisting problem. The wide variety of organisms and the varying conditions and situations where control is necessary present particular problems which preclude a simple solution. Preservative needs are found in the textile, paper, food, wood, coatings and paint fields. For example, it is known that coating compositions are subject to bacterial and fungal attack. Many preservatives have been employed but have been found to undergo diminution in activity or reduction in killing power upon storage or standing on the shelf. This is of particular importance in paint compositions which may be subject to frequent repeated contamination by opening of containers, insertion of brushes, exposure to dust and other sources. High concentration of preservative affects the brushing and spreading characteristics of the paint compositions or otherwise confers undesirable properties to the films formed therefrom.

Films formed from coating compositions are subject to mildew collection, that is, a phenomenon of the coating or film manifest by the presence of mold or fungus growth. Such attack results in eventual failure of paint or varnish film brought about by consumption of oil components or change in chemical composition of paint constituents by the microorganisms, pH change due to metabolic by-product formation, or discoloration by accumulation of mycelia and spores thereon. Furthermore, such growth frequently works under the film through abrasions and cracks producing deterioration of the structures underneath. Many fungicidal agents which have been suggested for inclusion in oil paints and film react with oils and pigments causing discoloration or fading thereof. Others act as antioxidants and anti-siccatives thereby slowing the drying rate. The protective effects produced by certain fungicidal agents are transitory since they vaporize or are otherwise dissipated out of the composition upon weathering. Certain others are decomposed by light and air.

Wood and wood products such as lumber employed in frame building constructions, poles or posts are subject to fungal attack manifest by surface growth which is followed by deterioration and loss of the wood. Many preservatives currently employed are subject to loss or inactivation on standing for long periods, particularly on exposure to high humidity or persistently damp conditions. Certain preservatives are undesirable because they bleed or crystallize (bloom) on the surfaces. Other cellulosic materials such as paper and textiles are also susceptible to microbially induced degradation. Where conditions of high humidity and temperature accelerate microbial growth, obnoxious and musty odors are frequently found to be produced.

Halophenols are widely used as preservatives because of their broad antimicrobial activity and relatively desirable properties such as low toxicity to higher animals, mild corrosiveness and relatively pleasant odor and lack of color. In contrast, other preservatives such as organic mercury compounds and organo-sulfur compounds have undesirable properties such as high toxicity to higher animals, unpleasant odor, high color, etc. However, the preservative activity is frequently inadequate, microbial growth and/or deterioration setting in, particularly if subject to weathering conditions or to standing over extended periods. Frequently a relatively large amount of preservative agents will provide adequate protective action but this preservative effectiveness is generally accompanied by impartation of undesirable properties to the material or system being treated. Furthermore, in most instances it is difficult, if not impossible, to reapply a preservative composition. These and similar problems have not been solved by the alternative of employing salts of halophenols. Thus, the alkali metal salts or their lower amine salts are found to have similar limitations as the halophenols themselves, frequently requiring high concentration to obtain preservation and further have an additional limitation of increased solubility in water, rendering them useless in applications where exposure to high humidity or water may be encountered. Other salts such as lead and copper salts have limitations such as extremely low solubility rendering compounding difficult or high color as in the case of copper salts or ready reactivity with hydrogen sulfides as in the case of lead salts. Thus, it is clear that there exists a need for an antimicrobial agent that is effective at low concentration and is resistant to diminution of its antimicrobial action.

It has been discovered that a new, active antimicrobial composition may be constituted by the combination of (1) a halophenol compound and (2) polyalkyleneimine. This composition when employed for antimicrobial uses prevents the growth of microorganisms at a concentration considerably less than that required when employing either component alone. This combination of reagents is particularly valuable from the standpoint of decreasing substantially the amount of halophenol or salt thereof necessary in many compositions. Moreover, the incorporation of the polyalkyleneimine in an amount of as little as $\frac{1}{20}$ part by weight for each part by weight of halophenol provides an improved composition which affords a protective action otherwise obtained only by using two to three times as much of the halophenol compound alone. Furthermore, the antimicrobial activity of the composition is of more lasting duration even under more rigorous conditions than that of either component alone even when employed in larger amounts. Thus, the present composition gives substantially complete protection when subjected to rigorous conditions of humidity and temperature. Under the same conditions, the halophenol compound gives no protection or requires such high concentrations as to affect the properties of the coating composition. The polyalkyleneimine when employed alone gave no protection under these rigorous conditions. The new compositions in accordance with this invention confer substantially no undesirable properties to the system to be treated.

By the expression "halophenol compound" as herein employed is meant halophenols as hereinafter defined and water-soluble salts thereof. The halophenols suitable for the practice of this invention are halogenated monohydric phenols and embrace halogenated parasiticidal phenols including alkyl and phenyl substituted phenols which have been chlorinated or brominated. Halophenols of particular value in the practice of this invention are those defined by the structure

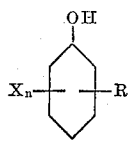

wherein R is selected from the group consisting of hydrogen, methyl, phenyl, chlorine and bromine, each X is at least one of bromine and chlorine, and $n$ is an integer of from 1 to 4, inclusive. Suitable halophenols are those having mixed chlorine and bromine as well as those having a single halogen species and include 2-bromo-4-chlorophenol, 2-bromo-4,6-dichlorophenol, 2,3,6-tribromo-p-cresol, 2,4,6-trichloro-m-cresol, 2,4,6-tribromo-m-cresol, 2,6-dibromo-4-chlorophenol, 2-chloro-4-phenylphenol, 2,3,4-trichlorophenol, 2,3,6-trichlorophenol, 2-bromo-4-phenylphenol, 4-bromo-2-phenylphenol, 4-chloro-2-phenylphenol, 4,6-dibromo-o-cresol, 2,5-dibromo-p-cresol, 3,6-dibromo-2-chloro-p-cresol, 2,4,5-trichlorophenol, 4-bromophenol, 2-bromophenol, 2,4-dibromophenol, 4-chloro-m-cresol, 2-chloro-4,6-dibromophenol, pentachlorophenol, pentabromophenol, 2,3,5,6-tetrachlorophenol, 2,3,4,5-tetrachlorophenol, 2,3,4,6-tetrachlorophenol, 2,3,5,6-tetrachloro-p-cresol, 2,4,5,6-tetrabromo-m-cresol, 2,4,6-trichlorophenol, 3,4-dichlorophenol, 2,3-dichlorophenol, 2,5-dichlorophenol, 2,6-dichlorophenol, 2,4-dichlorophenol, 4-chlorophenol, 3-chlorophenol and 2-chlorophenol.

When the compositions of the present invention are employed in aqueous systems or can be applied in aqueous treating compositions, water-soluble salts of the halophenols may be employed instead of the parent halophenol. Particularly suitable are the alkali metal, ammonium and amine salts such as potassium, lithium, sodium, ethanolamine, methylamine, ethylamine, trimethylamine, propylamine, triethanolamine, etc.

By the expression "polyalkyleneimine" is meant a polymeric compound obtained by polymerizing alkyleneimine and having a molecular weight of at least 300. The molecular weights of the polyalkyleneimine polymers may be determined by measuring the boiling point elevation of known amounts of such polymers in chloroform, generally in amounts forming a 3 to 4 percent solution by weight of the polymer. These polyethyleneimines generally have viscosities in aqueous 25 percent by weight soltuion of at least 3-4 centipoises at a temperature of 25° C. and include many which form highly viscous solutions. These polymeric compounds are well-known in the art and can be prepared, for example, by polymerizing alkyleneimine in the presence of such catalyst such as carbon dioxide, sodium bisulfite, hydrochloric acid, sulfuric acid, acetic acid, hydrogen peroxide, and so forth. Water-soluble polyalkyleneimines prepared by heating 2-oxazolidone or N-substituted oxazolidones are also suitable. The preparation of these compounds is widely described in the literature including United States Patents Nos. 2,182,306, 2,208,095, 2,553,696, 2,806,839 and Modern Plastics, November 1948, pages 130–186. These materials are commercially available in the form of concentrated aqueous solutions.

For the successful practice of this invention, it is desirable that the polyalkyleneimine prepared as above described be present in an amount of $\frac{1}{12}$ by weight of the amount of halophenol employed, although in many instances an amount of $\frac{1}{20}$ to $\frac{1}{15}$ by weight is satisfactory. When a water-soluble salt of halophenol is employed, the lower limit of the polyalkyleneimine is based on the weight of the halophenol equivalent of the salt. The upper limit of the polyalkyleneimine is not critical and is usually dictated by economic considerations, or factors to be considered with respect to the particular system where employed. Thus in aqueous systems such as latex or latex paint compositions an equal or excess amount of polyalkyleneimine may be employed. The optimum amount of the polyalkyleneimine with respect to the halophenol may also vary with the particular system in which the composition of the present invention is employed as well as with the amount of halophenol compound employed. For example, in oil paint formulations, best results are obtained when the composition is employed in a ratio of halophenol to polyalkyleneimine of about 6:1 to 12:1 and with a halophenol concentration in the paint formulation of from about 0.75 to about 1.5 percent by weight, although ratios of from 20:1 to 1:4 in a halophenol concentration of 0.5% to 2.0% are employed.

The new antimicrobial composition comprising (1) a halophenol compound and (2) a polyalkyleneimine is prepared by simply mixing the components. The composition is preferably employed in a solvent. Solvents particularly useful are polar solvents or mixtures of solvents in which one component is polar such as glycol ethers, alcohols, ketones or a mixture such as hydrocarbon-ketone-alcohol mixture or ether-alcohol mixture or aqueous-organic solvent mixture. The antimicrobial compositions may be applied by any method normally employed in the use of halophenols or salts thereof as antimicrobial agents. Thus, the material to be treated may be impregnated by dipping or immersion with or without pressure or brushed or sprayed thereon as in the case of wood and wood products, or may be mixed therewith as in the case of paint and other coating compositions. The mere application or incorporation of the composition of the present invention is sufficient to impart the desirable properties, and the effectiveness thereof does not require special after-treatment procedures such as baking.

One of the many antimicrobial applications in which the composition of the present invention has found particular usefulness is in preventing microbial growth and microbially induced degradation in coating compositions and films formed therefrom. Coatings and films formed from currently marketed compositions comprising oil, alkyd resin and latex suffer from mildew growth, and if employed on wood surfaces, the applications are followed by microbially induced degradation of the wood itself. However, compositions of the present invention, when incorporated into an oil paint and the resulting modified oil paint employed to paint wood panels, even soft wood panels, are found to give excellent control against mildew formation on the panels when the latter are exposed to very rigorous conditions of temperature and humidity. Similar results have been found when incorporated in latex paint. Furthermore, the present compositions are useful for increasing the shelf life of coating compositions particularly when such compositions are exposed to atmospheric or other sources of contamination. Coating materials containing compositions of the present invention have been found to resist microbial growth.

Another application of the present invention is in the preservation of wood against fungus induced decay. Thus, wood impregnated with compositions of the present invention and exposed to wood inhabiting fungi in growth promoting atmosphere, after a period of time shows little or no loss in weight from decay.

In all such applications, the degree of protection or control provided by compositions of the present invention was significantly greater than that provided by the halophenol compound alone even when employed at higher concentrations.

The following examples illustrate the invention but are not to be construed as limiting.

EXAMPLE 1

An oil paint having the composition set forth below was made by intimately blending in a conventional manner oil, varnish and pigments and adding to the resulting paste, driers, solvents and water.

| | Weight in pounds |
|---|---|
| Iron oxide pigment | 1498 |
| Amorphous Silica | 888 |
| Asbestine | 1476 |
| Spar varnish (60 percent N.V.) | 1180 |
| Linseed oil, Q bodied | 2888 |
| Mineral spirits | 626 |
| Water | 88 |
| Co drier (6 percent) | 28 |
| Pb drier (24 percent) | 70 |
| Mn drier (6 percent) | 11 |
| | 8153 |

Compositions comprising (1) halophenol and (2) polyethyleneimine in varying ratio of halophenol to polyethyleneimine were prepared employing propylene glycol monomethyl ether as primary solvent. The compositions also contained a small amount of water. A typical composition is that comprising 2,3,4,6-tetrachlorophenol and polyethyleneimine.

| Component: | Weight percent |
|---|---|
| 2,3,4,6-tetrachlorophenol | 30 |
| Polyethyleneimine [1] | 5 |
| Propylene glycol monomethyl ether | 50 |
| Water | 15 |

[1] Average molecular weight of 793 and viscosity of 9.52 absolute centipoises at 25° C. for an aqueous 25 percent by weight solution.

Above composition and other similar compositions varying in the ratio of halophenol to polyethyleneimine were prepared. These compositions were added to and intimately admixed with an oil paint composition above described to produce modified paint compositions, each containing a different antimicrobial composition, in an amount sufficient to provide halophenol at a concentration of 1 percent by weight. In this and succeeding examples, the weight is based on the total weight of the paint composition.

The modified paint compositions were then applied to panels of ponderosa pine. The painted panels were allowed to dry by standing for 2 to 3 days at room temperature. A second coat was then applied and the panels allowed to dry by standing for 5 days at room temperature. After drying, the panels were placed in a tropical chamber maintained at 88° F. and 95 percent humidity. After six weeks, the panels were visually evaluated for the amount of mildew growth and compared with check panels painted with unmodified paint. The check panels showed very heavy mildew growth wherein the surface of the panel was completely covered with growth. The results obtained expressed as control of mildew growth are shown in Table I.

Table I

| Halophenol | Polyethyleneimine Viscosity in Absolute Centipoises at 25° C. of an Aqueous 25 Percent by Weight Solution | Ratio Halophenol/ Polyethyleneimine | Control of Mildew Growth |
|---|---|---|---|
| 2,3,4,6-Tetrachlorophenol | 302.9 | 15:1 | Excellent. |
| Do | 31.79 | 5:1 | Do. |
| 2-Chloro-4-phenylphenol | 31.79 | 7.5:1 | Do. |
| Do | 302.9 | 12:1 | Do. |
| 3-Bromo-2,4,6-trichlorophenol | 302.9 | 15:1 | Good. |
| Do | 9.52 | 5:1 | Do. |
| Do | 31.79 | 10:1 | Excellent. |
| Pentachlorophenol | 9.52 | 6:1 | Do. |
| Do | 9.52 | 12:1 | Do. |
| 2,4,5-Trichlorophenol | 302.9 | 5:1 | Do. |
| Do | 9.52 | 10:1 | Do. |
| Do | 31.79 | 15:1 | Do. |
| None (Check) | | | None. |

EXAMPLE 2

In a similar operation, the effect of varying the total amount of a composition comprising (1) a halophenol and (2) a polyalkyleneimine while maintaining the ratio of the components constant was determined and compared with the effect of incorporating a similar amount of one of the components. A composition having the following components was prepared.

| Component: | Percent by weight |
|---|---|
| 2,3,4,6-tetrachlorophenol | 30 |
| Polyethyleneimine [1] | 2 |
| Water | 6 |
| Propylene glycol monomethyl ether | 62 |

[1] A commercial sample having a viscosity of 302.9 absolute centipoises at 25° C. for an aqueous 25 percent by weight solution.

The above composition (ratio of halophenol to condensation product, 15:1) was incorporated in the oil paint above described at levels to provide a concentration of 2,3,4,6-tetrachlorophenol of 0.5 percent, 0.75 percent and 1.0 percent in the paint. Other paint compositions were modified by the addition of one component. Thus, a treating composition of 30 percent 2,3,4,6-tetrachlorophenol in propylene glycol monomethyl ether was added to paint at a level of 1 percent and 3 percent. Another treating composition of 25 percent polyethyleneimine (viscosity of 302.9 absolute centipoises at 25° C.) in water was added to paint at a level of 1 percent. Panels were painted, dried and placed in a tropical chamber for 6 weeks and examined visually for the amount of mildew growth. Comparable control was obtained with 2,3,4,6-tetrachlorophenol alone only when the concentration of tetrachlorophenol was increased to 3 percent by weight. The results are given in Table II.

Table II

| Percent 2,3,4, 6-Tetrachlorophenol in Paint Composition | Percent Polyethyleneimine in Paint Composition | Amount of Mildew Growth |
|---|---|---|
| 0.5 | 0.033 | Slight. |
| 0.75 | 0.05 | Trace. |
| 1.0 | 0.067 | None. |
| 1.0 | None | Moderate. |
| 3.0 | None | Slight. |
| None | 1.0 | Very Heavy. |
| None | None | Do. |

EXAMPLE 3

In similar operations, compositions comprising (1) 2,4-dibromophenol and (2) polyethyleneimines varying in molecular weight were prepared in varying ratios of halophenol to polyethyleneimine in propylene glycol monomethyl ether and water. These compositions were similar to those described in Example 1 and contained 30 percent by weight of 2,4-dibromophenol. The compositions were incorporated into paint to provide modified paint compositions containing 1 percent by weight of 2,4-dibromophenol. Other paint samples were modified with either 2,4-dibromophenol in propylene glycol monomethyl ether or polyethyleneimine in water. Wood panels were painted with modified paint as well as unmodified paint. The panels were then exposed to the conditions of the tropical chamber for six weeks as described in Example 1 and examined visually for mildew growth and compared with control panels painted with unmodified paint. The results are given in Table III.

Table III

| Percent 2,4-Dibromophenol | Polyethyleneimine Viscosity in Absolute Centipoises at 25° C. of an Aqueous 25 Percent by Weight Solution | Percent Polyethyleneimine | Amount of Mildew Growth |
| --- | --- | --- | --- |
| 1 | 302.9 | 0.167 | Slight. |
| None | 302.9 | 1.0 | Very Heavy. |
| 1 | 9.52 | 0.083 | Trace. |
| None | 9.52 | 1.0 | Very Heavy. |
| 1 | 31.79 | 0.167 | Moderate. |
| None | 31.79 | 1.0 | Very Heavy. |
| 1 | | | Heavy. |
| None | | | Very Heavy. |

EXAMPLE 4

A treating composition having the following composition is prepared:

| | Weight percent |
| --- | --- |
| Pentachlorophenol | 30 |
| Polyethyleneimine (average molecular weight of 5000) | 2.5 |
| Propylene glycol monomethyl ether | 58 |
| Water | 9.5 |

The above composition is intimately admixed with an oil paint having the composition set forth in Example 1 to provide modified oil paint compositions containing the above composition in varying concentrations. Other samples of oil paint are modified with a 30 percent solution of pentachlorophenol in propylene glycol monomethyl ether or with a 30 percent solution of polyethyleneimine in aqueous propylene glycol monomethyl ether in varying concentrations. The modified oil paint samples are as follows:

| Paint Sample | Concentration of Pentachlorophenol in Weight Percent | Concentration of Polyethyleneimine in Weight Percent |
| --- | --- | --- |
| 1 | 0.75 | 0.075 |
| 2 | 1.0 | 0.1 |
| 3 | 1.5 | 0.15 |
| 4 | 1.0 | 0.0 |
| 5 | 2.0 | 0.0 |
| 6 | 0.0 | 1.0 |

The modified oil paint samples as well as unmodified paint are applied to panels of ponderosa pine and placed in a tropical chamber as described in Example 1. The panels are examined visually at the end of four weeks and at the end of eight weeks. At the end of four weeks, panels painted with samples 1, 2, 3 and 5 show no mildew growth. Panels painted with samples 4, 6 and unmodified paint show mildew growth. At the end of eight weeks, panels painted with samples 1, 2 and 3 show substantially no mildew growth, panels painted with sample 5 show moderate mildrew growth and panels painted with samples 4, 6 and unmodified paint show heavy mildew growth.

EXAMPLE 5

In a manner similar to that described in Example 1, compositions comprising (1) halophenol and (2) polyalkyleneimine are prepared in propylene glycol monomethyl ether at a concentration of 30 percent by weight of halophenol as follows:

| Halophenol | Polyalkyleneimine | Ratio Halophenol/Condensation Product |
| --- | --- | --- |
| 2,3,4,5-Tetrabromophenol | Polyethyleneimine (average molecular weight 1500). | 12:1 |
| Do | do | 8:1 |
| 2,4,6-tribromo-m-cresol | do | 10:1 |
| 2,4,6-Trichloro-m-cresol | Polypropyleneimine (average molecular weight 1200). | 8:1 |
| Do | do | 10:1 |
| 2,3,5,6-Tetrachloro-p-cresol | do | 12:1 |
| 3,4-Dichlorophenol | do | 10:1 |
| 2,4,6-Tribromophenol | do | 12:1 |

The above compositions are incorporated into commercial oil paint compositions at a level sufficient to provide modified paint compositions containing 1.5 percent by weight of the halophenol component. Wood panels are painted with the modified paint compositions as well as with unmodified paint and exposed in a tropical chamber for 2 weeks. The panels are then visually examined as previously described. Panels painted with modified paint compositions show good control of mildew growth whereas panels painted with paint compositions modified with polyethyleneimine or polypropyleneimine alone as well as panels painted with unmodified paint show no control of mildew growth.

EXAMPLE 6

A composition comprising (1) tetrachlorophenol and (2) polypropyleneimine (having a viscosity of 720 centipoises at 25° C. for an aqueous 25 percent by weight solution) is prepared as follows.

| Component: | Percent by weight |
| --- | --- |
| 2,3,4,6-tetrachlorophenol | 30 |
| Polypropyleneimine | 3 |
| Water | 6 |
| Propylene glycol monomethyl ether | 61 |

The composition is incorporated in oil paint previously described at a level to provide a concentration of 2,3,4,6-tetrachlorophenol of 1 percent in paint. A treating composition of 30 percent 2,3,4,6-tetrachlorophenol in propylene glycol monomethyl ether is added to paint at a level of 1 percent. Another treating composition of 30 percent polypropyleneimine in aqueous propylene glycol monomethyl ether is added to paint at a level of 1 percent. Wood panels are painted with above composition as well as an unmodified paint, dried and placed in a tropical chamber for 6 weeks and examined visually for mildew growth. The panels painted with polypropyleneimine and the check panels are covered with heavy mildew growth. The panels painted with tetrachlorophenol are partially covered with mildew growth. The panels painted with the composition comprising 2,3,4,6-tetrachlorophenol plus polypropyleneimine show no mildew growth.

EXAMPLE 7

Composition comprising varying ratios of (1) pentachlorophenol and (2) polyethyleneimine having a molecular weight of 1370 are prepared by mixing the appropriate amount of pentachlorophenol in isopropyl alcohol with an aqueous solution of polyethyleneimine. The compositions have constituents as follows.

Composition 1—Halophenol+polyalkyleneimine in ratio of 1:1:

| | Grams |
| --- | --- |
| Pentachlorophenol | 10 |
| Polyethyleneimine | 10 |
| Water | 15 |
| Isopropyl alcohol | 65 |

Composition 2—Halophenol+polyalkyleneimine in ratio of 6:1:

| Pentachlorophenol | 2 |
| --- | --- |
| Polyethyleneimine | 12 |
| Water | 3 |
| Isopropyl alcohol | 53 |

Composition 3—Halophenol+polyethyleneimine in ratio of 1:4:

| Pentachlorophenol | 5 |
| --- | --- |
| Polyethyleneimine | 20 |
| Water | 30 |
| Isopropyl alcohol | 70 |

In separate operations, the above compositions as well as composition of pentachlorophenol and a composition of polyethyleneimine are incorporated in latex paint samples to produce modified latex paint compositions. The latex paint employed for this operation is made by intimately blending a pigment dispersion having the following composition:

| | Parts by weight |
|---|---|
| Titanium dioxide | 250 |
| Clay | 50 |
| Calcium carbonate | 50 |
| Diatomaceous earth | 25 |
| Potassium tripolyphosphate | 1.5 |
| Water | 270 | with a 48 percent solids content synthetic latex composition comprising a copolymer of 60 percent styrene and 40 percent butadiene.

100 gram samples of modified latex paint compositions are inoculated with 0.5 milliliter of a 24 hour culture of a mixture of organisms consisting largely of the Pseudomonas, Aerobacter and Proteus species previously isolated from spoiled samples of alpha-protein, latex or latex paint. The inoculated samples are incubated for 24 hours at 30° C. The incubated samples are then streaked on nutrient agar plates and the streaked plates incubated at 30° C. for 72 hours. Thereafter the plates are examined for microbial growth and the results are as given in Table IV.

Table IV

| Sample Modified With | Total Concentration (Percent Weight) | Percent Weight Pentachlorophenol | Percent Weight Polyethyleneimine | Microbial Growth |
|---|---|---|---|---|
| Pentachlorophenol | 0.4 | 0.4 | 0.0 | Growth. |
| Polyethyleneimine | 0.2 | 0.0 | 0.2 | Do. |
| Composition 1 | 0.1 | 0.05 | 0.05 | None. |
| Composition 2 | 0.1 | 0.086 | 0.014 | Do. |
| Composition 3 | 0.1 | 0.02 | 0.08 | Do. |
| Control | 0.0 | 0.0 | 0.0 | Growth. |

EXAMPLE 8

In an operation similar to that described in Example 7, a treating composition is prepared wherein the halophenol is employed in the form of a water-soluble salt. The ratio of halophenol salt to polyethyleneimine is 1:2. The treating compositions are prepared by mixing the following components:

| | Weight percent |
|---|---|
| Polyethyleneimine (average molecular wt. 1500) | 28.6 |
| Sodium pentachlorophenoxide | 14.3 |
| Methanol | 16.2 |
| Water | 40.9 |

The composition is incorporated into latex paint to produce modified paint compositions as follows:

| Composition | Percent Weight Total | Percent Weight Pentachlorophenoxide | Percent Weight Polyethyleneimine |
|---|---|---|---|
| 1 | 0.05 | 0.017 | 0.033 |
| 2 | 0.1 | 0.033 | 0.067 |
| 3 | 0.2 | 0.067 | 0.133 |

Other latex paint samples are modified by either 0.4 percent by weight of sodium pentachlorophenoxide or 0.4 percent by weight of polyethyleneimine alone. The latex paint employed is that having the composition described in Example 7. The modified as well as unmodified paint samples are inoculated, incubated, streaked on plates and the latter incubated as previously described and observed at the end of 72 hours. The plates streaked with modified paint compositions comprising sodium pentachlorophenoxide+polyethyleneimine show no growth of microorganisms whereas plates streaked with latex paint modified with sodium pentachlorophenoxide alone or polyethyleneimine alone as well as unmodified paint show heavy microbial growth.

We claim:

1. A composition comprising (1) a halophenol compound, said halophenol compound being selected from the class consisting of halophenols, halocresols, monohalophenylphenols and water-soluble salts of said halophenols, halocresols and monohalophenylphenols, wherein each halogen in said halophenol compound is selected from the group consisting of chlorine and bromine and (2) a polyalkyleneimine having a viscosity at 25° C. in aqueous 25 percent by weight solution of from about 3 to about 720 centipoises, and wherein said polyalkyleneimine is present in an amount of from about $\frac{1}{20}$ of the amount to about 4 times the amount of halophenol equivalent of the halophenol compound when based on weight.

2. A composition comprising (1) a halophenol compound, said halophenol compound being selected from the group consisting of (a) halophenols having the structure

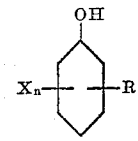

wherein R is selected from the group consisting of hydrogen, methyl, phenyl, chlorine and bromine, each X is selected from the group consisting of bromine and chlorine, and $n$ is an integer of from 1 to 4, inclusive, and (b) water-soluble salts of said halophenols; and (2) a polyalkyleneimine having a viscosity at 25° C. in aqueous 25 percent by weight solution of from about 3 to about 720 centipoises, wherein said polyalkyleneimine is present in an amount of from about $\frac{1}{20}$ the amount of halophenol to about 4 times the amount of halophenol when based on weight.

3. A composition comprising (1) a chlorophenol compound, said chlorophenol compound being selected from the group consisting of (a) chlorophenols having the structure

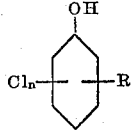

wherein R is selected from the group consisting of hydrogen, methyl, phenyl, chlorine and bromine, and wherein $n$ is an integer of from 1 to 4, inclusive, and (b) water-soluble salts of said halophenols; and (2) a polyalkyleneimine having a viscosity at 25° C. in aqueous 25 percent by weight solution of from about 3 to about 720 centipoises, wherein the ratio of said chlorophenol to polyalkyleneimine is from about 20:1 to about 1:4.

References Cited in the file of this patent

UNITED STATES PATENTS

| 1,373,499 | Gardner | April 5, 1921 |
| 2,182,081 | Hatfield | Dec. 5, 1939 |
| 2,704,732 | Copeman et al. | Mar. 22, 1955 |

FOREIGN PATENTS

| 424,597 | Great Britain | Feb. 25, 1935 |
| 809,414 | France | Mar. 3, 1937 |